United States Patent [19]

Aiuola et al.

[11] Patent Number: 4,676,286

[45] Date of Patent: Jun. 30, 1987

[54] VOLUMETRIC FILLING MACHINE

[75] Inventors: Franco Aiuola; Paolo Nipoti, both of Bologna, Italy

[73] Assignee: Azionaria Costruzioni Macchine Automatiche, A.C.M.A. S.p.A., Bologna, Italy

[21] Appl. No.: 912,675

[22] Filed: Sep. 25, 1986

Related U.S. Application Data

[63] Continuation of Ser. No. 796,534, Nov. 12, 1985, abandoned, which is a continuation of Ser. No. 572,773, Jan. 23, 1984, abandoned.

[30] Foreign Application Priority Data

Jan. 28, 1983 [IT]  Italy ................................ 3324 A/83

[51] Int. Cl.⁴ .............................................. B65B 3/04
[52] U.S. Cl. .................................... 141/145; 141/147
[58] Field of Search ............... 141/142, 143, 145, 147, 141/152

[56] References Cited

U.S. PATENT DOCUMENTS 3,870,089  3/1975  Laub, III ............................. 141/44

Primary Examiner—Stephen Marcus
Assistant Examiner—Mark Thronson

[57] ABSTRACT

A filling machine includes a first revolving platform on which containers to be filled are supported, and a second revolving platform arranged, at an adjustable height, above the first, and having peripheral seatings for fixing thereto of a number n of dosage-delivery units less than or equal to the maximum number of dosage-delivery apparatus which can be accommodated peripherally on said second platform.

Each dosage-delivery apparatus is functionally complete and comprises a control for the volumetric dosage of the product operable by a motor device at a velocity equal to the angular velocity of the second platform, and in the case of necessity for the correction of the dosage, at a velocity different from the angular velocity of the second platform.

4 Claims, 3 Drawing Figures

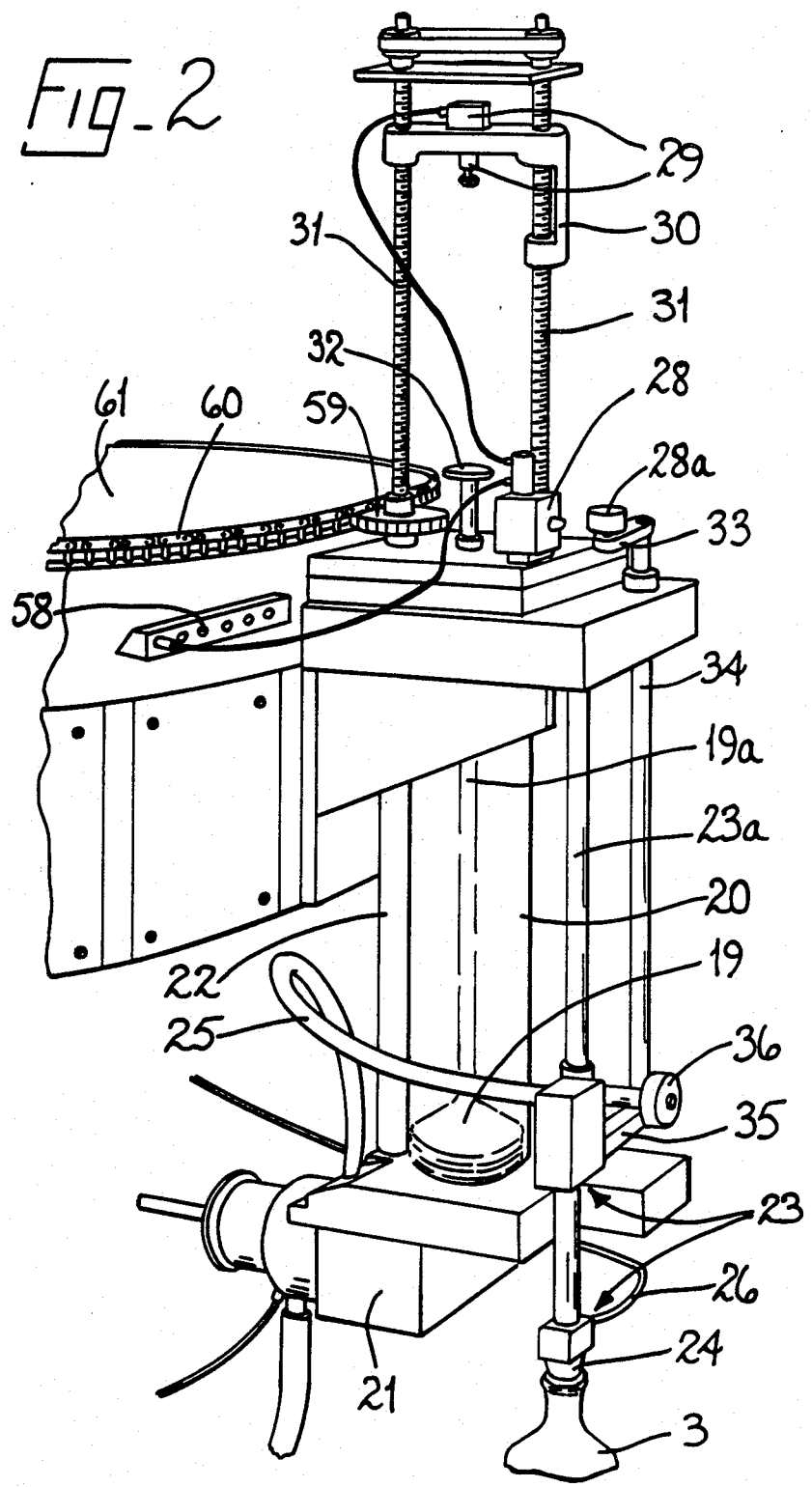
Fig_2

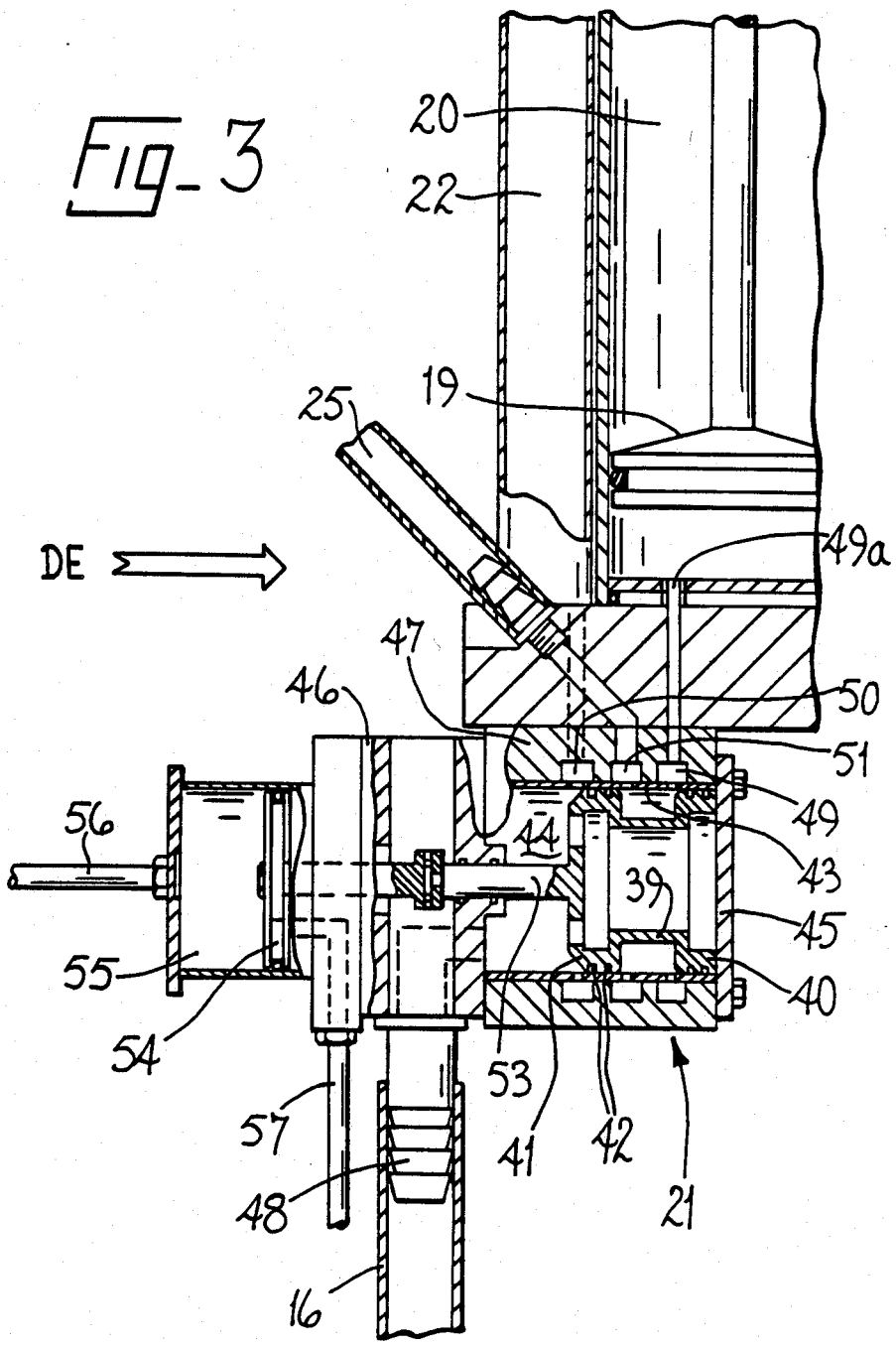

VOLUMETRIC FILLING MACHINE

This is a continuation of co-pending application Ser. No. 796,534 filed on Nov. 12, 1985, now abandoned, which is a continuation of Ser. No. 572,773, filed Jan. 23, 1984, now abandoned.

FIELD OF THE INVENTION

The present invention is concerned with a machine for filling containers, for example bottles or small jerry cans, with fluid products (in particular liquid products) comprising modular product dosage and delivery units, which offers the possibility of regulating the dosage of the product even with the machine in motion and with simultaneous regulating intervention on all operative units independently of their position during the filling cycle of the containers.

BACKGROUND OF THE INVENTION

For filling containers with liquid products filling machines known as volumetric filling machines already exist. Such machines comprise a revolving platform on which containers to be filled are carried one behind the other, suitably spaced from each other. Containers entering the filling cycle are clamped on to the platform by filling devices which form part of the machine and which are supported above the revolving platform. These devices form part of the product dosage and delivery units which are equiangularly spaced from one another and fixed to a second revolving platform connected to the first. The number of such units is established during the design phase of the machine and each unit includes a dosage apparatus which effects dosage of the product using a double-acting piston connected, by means of a control and distribution valve (normally of the slide type), to the feed source of the product, according to the capacity of the containers to be filled, and a delivery apparatus having a nozzle which can be positioned in the mouth of a container and connected to the outlet of the control and distribution valve of the dosage apparatus.

The dosage of the apparatus may be controlled according to a well known technique, by various means, e.g. controlling, with detection devices, the stroke of the piston of the dosage device. U.S. Pat. No. 3,870,089 describes a filling machine, of the type with which the present invention is concerned, in which a number of dosage apparatuses are fixed to a first platform, each apparatus having a piston whose rod is extended vertically upwards away from the surface of the platform on which the containers to be filled are carried. The delivery apparatuses are supported by the second platform and connected to the dosage apparatuses by corresponding product control and distribution valves fixed to the first platform. The second platform is rotated by a first drive means and causes rotation of the first platform.

Between the first and second platforms a disc of adjustable height in relation to the first platform is positioned. The disc supports a series of microswitches, equal in number to the number of dosage apparatuses, arranged in such a way that they can be operated by a striker connected to the piston rod of each dosage apparatus. These microswitches, when activated, cause operation of the control and distribution valves to which the dosage apparatuses are connected to expel the product from one part or from the other of the chambers in which the pistons of the dosage apparatuses slide, the parts of the chamber being at opposite sides of the piston. Depending on the height of the disc relative to the first platform, there is a desired stroke of the piston inside the relative chambers and therefore a different volumetric dosage of the product to be sent to the delivery apparatuses. Excellent results have been achieved with machines of this type as regards dosage of the product and operative speed; however, it has been noticed that such machines do not lend themselves to variations in the number of operative apparatuses and furthermore that for attention to a dosage apparatus or a delivery apparatus, it is necessary to stop the machine for the whole length of time required for the resetting of functioning conditions of the apparatus which is being attended to.

OBJECTS OF THE INVENTION

One object of the present invention is to eliminate the difficulties mentioned above and in particular, to provide a volumetric filling machine where each dosage/delivery apparatus is separate from the mainstructure of the machine and may easily be connected to it, so that it can be quickly replaced where necessary.

A further object of the present invention is to provide a filling machine in which the setting of the product dosage to be delivered is automatically obtainable on all the dosage apparatuses by control devices connected to the structure of the machine and acting on control devices incorporated in each dosage/delivery apparatus.

Another object of the present invention is to provide a volumetric filling machine with a simple construction and which therefore can be economically produced.

SUMMARY OF THE INVENTION

The above and other objects are achieved by providing a volumetric filling machine for filling containers with liquid products comprising a first revolving platform which transfers the containers from an entry to an exit region angularly spaced from the former, a second revolving platform arranged above the first at an adjustable height, provided peripherally with seatings for a number n of dosage-delivery apparatuses equally spaced one from another and less than or equal to the maximum number of dosage-delivery apparatuses which can be accomodated on the periphery of the second platform, each dosage-delivery apparatus comprising a control piston valve for control and distribution of the product, a first activating device activatable by means which detect the presence of a container below a delivery device of the apparatus, the first activating device emitting a start signal to start the filling cycle by operating the control valve, a second activating device activatable by the rod of the piston during its displacement from its position at the beginning of the filling cycle, the second activating device also being operable to cause the control valve to reverse the movement of the piston and being adjustable along the path followed by the piston rod by means of a drive mechanism which derives its motion from revolving means independent of the first and second revolving platforms, the second platform and the revolving means being connected to first drive means which rotates them at the same angular velocity, and the revolving means also being connected to second drive means by which the angular velocity of the revolving means relative to the second platform can be adjusted depending on a desired correction of the volumetric dosage of the product.

Advantageously, the subject machine, by allowing the fixing to the second revolving platform of a number n of dosage delivery apparata which is less than the number n of apparata that it is possible to fix to such platform, allows a great versatility of uses of the machine which, for example can be used to obtain different levels of productivity, and for the filling of containers having very different section one from another, by simply altering the number of dosage-delivery apparata and therefore the distance between said apparata.

A further advantage is given by the fact that in the case of a breakdown in the functioning of one or more of the dosage-delivery apparata, it suffices to stop the productive cycle of the machine only for the time needed for their replacement, without having to have long halts or discontinuity in the productive cycle, all of which contributes to economy in the use of the machine.

BRIEF DESCRIPTION OF THE DRAWINGS

There now follows a detailed description to be read with reference to the accompanying drawings of a filling machine embodying the invention. It will be realised that this machine has been selected for description to illustrate the invention by way of example and not of limitation.

In the accompanying drawings:

FIG. 2 is a diagrammatic perspective view of a dosage-delivery apparatus and

FIG. 3 is a side view, partly in section, of part of the dosage-delivery apparatus showing a valve for control and distribution of the product.

DESCRIPTION OF THE PREFERRED EMBODIMENT

Figure 1:
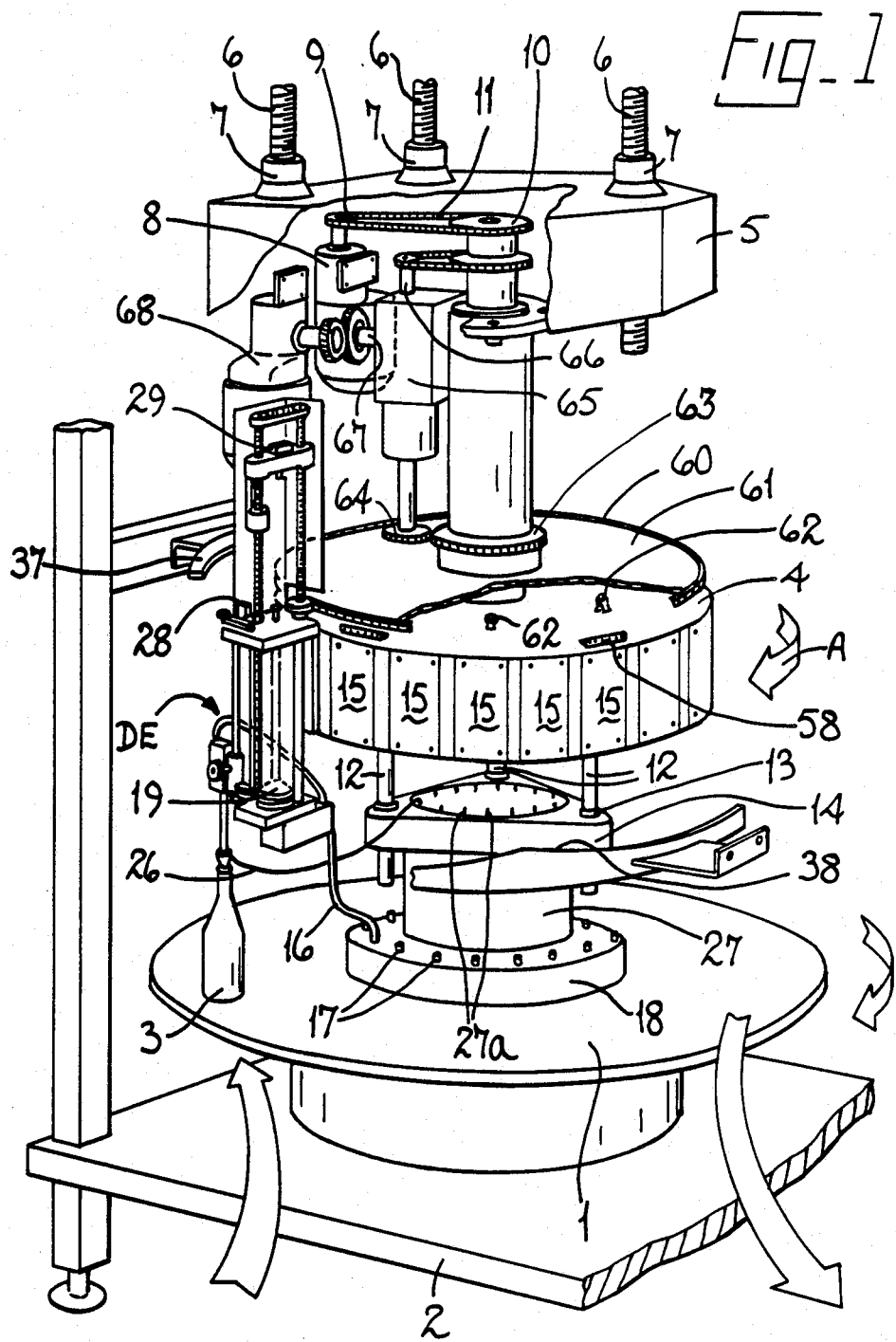
FIG. 1 is a diagrammatic perspective view of a filling machine embodying the invention but showing only one dosage/delivery apparatus.

The filling machine shown in FIG. 1 comprises a first platform 1 mounted for rotation on a base frame 2 of the machine and on to which containers 3 arriving from an automatic feed line (not shown in the drawings) are brought to rest. A second revolving platform 4 is supported above and coaxial to the first platform 1 by another platform 5 (not revolving) in its turn supported by three threaded rods 6 which are screwed down through corresponding bushes 7 installed in the platform 5. The rods 6 are fixed to an upper part of the base frame of the machine (not visible in the drawings). The threaded rods 6 are connected to a reduction gear driven by a motor (not shown) supported by the base frame of the machine, so that they can all be rotated in the same direction. The rods 6 cause, depending on their direction of rotation, raising or lowering of the third platform 5 (and thus of the second platform 4) relative to the first platform 1. This adjustment allows the positioning of the second platform 4 in relation to the first platform 1 depending on the height of the containers 3 to be filled.

The second platform 4 is connected to a first drive unit 8, supported by the third platform 5, by means of a pair of gear wheels 9, 10 and a closed chain 11.

The first drive unit 8 rotates the second platform 4 in the direction of arrow A in FIG. 1; from this second platform 4 the rotation of movement is transmitted to the first platform 1 by means of three cylindrical rods 12 fixed, at one end, to the platform 4 and slidingly engaged, in corresponding bushings 13 located in a support 14 integral with a tank 27 fixed to the first platform 1 and which will be described later.

The second platform 4 presents, peripherally, a series of seatings 15 provided with holes for fixing thereto a number n of product dosage/delivery apparatuses less than or equal to the maximum number of dosage/delivery apparatuses for example as that indicated by DE in FIG. 1. Each apparatus DE is connected by a conduit 16 to a pipe union 17 carried by a revolving distributor 18 connected to first platform 1 and which can be connected, by known means to a main reservoir of the product, (not shown in the drawings), to provide an outlet for the product. The revolving distributor 18 has a number of pipe unions equal to the number of seatings 15 on the second platform 4.

The dosage-delivery apparatus DE comprises a double acting piston 19 sliding inside a cylindrical chamber 20 communicating with a valve 21, for control and distribution of the product, by two passages of which one opens into a lower part and the other, by means of a conduit 22, into an upper part of the cylindrical chamber 20.

A product delivery device 23 (of well known type) is supported in such a way as to be able to traverse vertically along a rod 23a to occupy either a first position in which it is in fully lowered, a second intermediate position, higher than the first, in which a delivery nozzle 24 rests on a mouth of a container, or a third raised position in which the nozzle is remote from the mouth of the container. The delivery nozzle 24 is connected to the valve 21 by a conduit 25; the delivery nozzle 24 is connected by a small tube 26 to the tank 27 (see FIG. 1) in order to recover any product which drops from the delivery nozzle during filling of a container 3. The tank 27 has a series of entrance couplings 27a equal in number to the number of fixed seatings 15 for the apparatus DE.

Two pneumatic diverting valves 28, 29 are connected to the valve 21. The valve 28 is fixed so as to be activated by a roller 28a (described later) and the valve 29 is connected to a support 30, moveable vertically in two directions along two threaded rods 31 supported by a turret located above the cylindrical chamber 20. The valve 29 is arranged so as to be activated by a striker 32 connected to a rod 19a of piston 19, the rod projecting from the chamber 20 through a sealed passage.

On one of the rods 31 which is nearest to the platform 4 is fixed a gear wheel 59 which engages a chain 60 fixed to the periphery of a disc 61 (see FIGS. 1 and 2) positioned above the platform 4 and supported on it by means of a series of slide rollers 62). The disc 61 is coaxial with the platform 4 but, so far as rotation is concerned, it is independent of it; it is connected to a crown wheel 63 which is in engagement with a gear wheel 64 on an outlet shaft of a differential unit 65 supported by the third platform 5.

The differential unit 65 presents a first input shaft 66 drivingly connected to a rotary drive shaft of the second platform 4 and a second input shaft 67 drivingly connected to a second drive unit 68 also supported by the platform 5. The roller 28a is supported at the free end of a small arm 33 fixed to the upper part of a rod 34 parallel to the rod 23a and slidable relative to the structure of the apparatus DE in a bushing in a vertical hole in the structure. The lower end of the rod 34 is connected, by a small bracket 35 to the body of the delivery device 23; the body also supports a cam following a roller 36 of which more later. On a horizontal plane the roller 28a is normally kept distant from the valve 28 and is at the same vertical level as the valve 28, so as to be able to activate it, only if the nozzle 24 is resting on the mouth of a container 3. Only in this condition can the roller 28a be engaged by a fixed cam 37 (see FIG. 1) supported by the base frame 2 of the machine and at predetermined times, activate the valve 28.

The cam follower roller 36 is designed to engage the track of a second cam 38, also supported by the base frame 2 of the machine, located between an exit region 0 and an entry region I for containers 3. The cam 38 is shaped so as to cause a lifting of the delivery device 23 at the end of the filling cycle so as to free the mouth of the filled container 3, and to then bring the nozzle to rest on the mouth of a new container 3 entering the machine at the start of the filling cycle.

With reference to FIG. 3 the valve 21 includes a slide 39 substantially spool shaped, provided with two shoulders 40 and 41 at opposite ends to each other, having peripheral sealing rings 42 which slide against the internal surface of a cylindrical jacket 43 which defines the shell of a cylindrical chamber 44 in which the slide 39 can slide axially.

The cylindrical chamber 44 is closed at the ends by two flanges 45, 46 mechanically fixed to a housing 47 of the valve 21; the housing 47 has a pipe union 48 by which one of the conduits 16 can be connected for the connection of valve 21 to the revolving distributor 18. The housing 47 also has three annular recesses 49, 50, 51. The recess communicates with the lower part of the cylindrical chamber 20 below the piston 19 by means of a channel 49a, the recess 50 communicates with the conduit 22 and the recess 51 communicates with the conduit 25 which connects the valve 21 to the delivery device 23.

The shoulders 40 and 41 of the slide 39 define an annular sealed recess 52 through which, at successive times and depending on the position of the slide 39, the recesses 49, 51 and 50, 51 respectively may be put in communication. The slide 39 is hollow inside and is internally in free communication with the cylindrical chamber 44. The slide 39 is so dimensioned that when the recesses 49, 51 intercommunicate with each other, the recess 50 is in free communication with the cylindrical chamber 44; when the recesses 50, 51 are in intercommunication with each other, the recess 49 is in free communication with the cylindrical chamber 44. The slide 39 has a stem like extension 53 which, through a passage sealed by the flange 46, is connected to a rod of a small pneumatically-controlled piston 54 sliding inside a cylindrical chamber 55 connected, by means of two small tubes 56 and 57, to a compressor device of the machine (not shown). The small tubes 56 and 57 are connected to a connection element 58 fixed to the second platform 4 and in communication with the compressor by means of a revolving distributor (not shown) inside the machine.

The operation of the machine shown in the drawings is hereinafter described in relation to the filling cycle of a container.

In a starting condition, a delivery nozzle 24 rests on the mouth of a container 3 which has arrived from the entry region I of the machine, the piston 19 of the dosage-delivery apparatus DE is at this time in a fully downward position and the chamber 20 is full of the product to be delivered. The first drive unit 8 is activated and therefore the platforms 1, 4 revolve in the direction of the arrow A (FIG. 1), because of the effect of the connection between the rotation shaft of the platform 4 and the differential unit 65, and of the connection between the differential unit 65 and the disc 61 this latter revolves at the same angular velocity as the platforms 1, 4. The second driven unit 68 is at this time stationary and the valve 29 is positioned at a height h in relation to the striker 32 determined by the quantity of the product to be dosed and run into the container 3; the slide 39 of the valve 21 is in the position shown in FIG. 3.

When the roller 28a meets the track of the cam 37 it is displaced towards the valve 28 until it operates its sensing device. Having been activated the valve 28 admits air under pressure into the chamber 55 of the piston 54 through the small tube 57: the slide 39 is thus displaced to the left (viewing FIG. 3) and puts the chamber 44 of the valve 21 in free communication with the lower part of the chamber 20 in which piston 19 slides. The recess 50 intercommunicates with the recess 51 by means of the sealed recess 52. Under the thrust of the product coming in, the piston 19 begins to traverse upwards whilst the product in the chamber 20 above the piston 19 is expelled from the chamber 20, arrives at delivery device 23 through the conduit 22, recesses 50, 51, 51 and conduit 25 and is then delivered into the container 3.

When the striker 32 operates the sensor of the valve 29 this admits air under pressure into the chamber 55 through the small tube 56 and the slide 39 returns into the position shown in FIG. 3.

In this new condition the chamber 44 of the valve 21 is put into intercommunication through the conduit 22, with the upper part of the chamber 20 of piston 19 whilst the lower part of the chamber 20 is put into intercommunication with delivery device 23 via the recesses 49, 52, 51. The piston 19 thus starts to move downwards, assisting outflow of the product from the chamber 20 below it towards the delivery device 23, whilst a new quantity of product enters the upper part of the chamber 20. The filling cycle ends when the piston 19 reaches its fully downward position and when the container 3, because of the rotation of the platforms 1 and 4, reaches the exit region 0. Having reached this area the cam follower roller 36 engages the cam track 38, causing a gradual upward movement of the delivery device 23 whilst simultaneously, the filled container 3, leaves on the discharge line.

By the continuing rotation of the platforms 1, 4 dosage apparatus DE reaches the entry area I.

If no new container is present in register with the delivery nozzle 24, when the cam follower roller 36 leaves the track of the cam 38, the delivery device 23 is carried into its fully downward position, and in such condition it is not possible for the roller 28a to engage the cam 37 and therefore the dosage apparatus DE is not activated. If during the operation of the machine an error in the weight of the product fed into the container 3 is discovered, correction of the dosage is possible by temporary activation of the second drive unit 68 which drives the differential unit 65. As has been described above the disc 61 (under normal operating conditions) rotates at the same angular velocity as the second platform 4; in this condition there is no rotation of the gear wheel 59 and therefore the support 30 of valve 29 remains stationary in the position established at the start.

By activation of the second drive unit 68 a change in the angular velocity of the disc 61 in relation to the angular velocity of the second platform 4 occurs; this variation will be an increase or a decrease, according to the error in weight discovered in the filled containers.

Because of this variation a rotation of the gear wheel 59 is obtained in one or the other direction, and thus the threaded rods 31 rotate with consequent upward displacement (in the case of shortage in weight) or downwards displacement (in the case of excess weight) of the support 30 and therefore of valve 29.

The variation in position of the valve 29 permits the stroke of piston 19 to be varied and in consequence the amount of the volumetric dosage of the product to be sent to the delivery device 23 of each apparatus DE fixed to the second platform 4; this dosage regulation is simultaneous for all the valves 29 of apparatuses DE fixed to the second platform 4.

The number of apparatuses DE used are chosen depending on the various operative needs, but essentially the chosen apparatuses are equally spaced one from another. In the case of the use of a number of apparatuses DE less than the maximum number of apparatuses DE which may be fixed to platform 4, it is sufficient to close the couplings 27a and unused connections 58 in order to operate the machine. Obviously, depending on the number of dosage-delivery apparatuses DE and therefore on the distance between the delivery devices 23, it will be necessary to adjust the feeding devices and the devices which propel the containers 3 towards and away from the filling machine.

Having thus described our invention, what we claim as new and desire to secure by Letters Patent of the United States is:

1. A volumetric filling machine for filling containers having a mouth with liquid product and operable to correct the volumetric dosage of the product into the containers comprising a first revolving platform which transfers the containers from an entry region through a filling cycle to an exit region angularly spaced from the entry region, a plurality of delivery-apparatus spaced one from another a second revolving platform arranged above the first and provided peripherally with seatings for said plurality of dosage-delivery apparatuses, said dosage-delivery apparatuses being fixed to said seatings, each dosage-delivery apparatus including a cylinder, a displaceable piston mounted in said cylinder having a piston rod connected thereto, said piston and said piston rod being displaceable to dispense a volumetric dosage of the liquid product, a delivery device, a control valve for controlling the movement of said piston, a first activating device activated when a container is positioned below said delivery device of the apparatus, the first activating device emitting a start signal to start the filling cycle by operating said control valve, a second activation device activatable by the piston rod during its displacement from its position at the beginning of the filling cycle, said second activating device being operable to cause the control valve to reverse the movement of said piston, adjustment means for adjusting the position of said second activating device in a direction parallel to the axis of said piston rod, revolving means for driving said adjustment means, first drive means for said revolving said second platform and revolving means at the same angular velocity whereby said revolving means does not serve to drive said adjustment means, and second drive means connected to said revolving means by which the angular velocity of said revolving means relative to the second platform can be adjusted so that the revolving means drives said adjustment means to adjust the second activating device depending on the desired correction of the volumetric dosage of the product.

2. A volumetric filling machine according to claim 1 wherein said delivery device includes a delivery nozzle and including a pneumatic control circuit for said control valve, said first and second activating devices comprising first and second valves in said circuit, and wherein said delivery device is slidable so that it can assume a first position in which it is fully lowered, a second position higher than the first in which the delivery nozzle rests on the mouth of a container and a third position in which it is raised relative to the mouth of a container, and means connected to said delivery for activating said first activating device only when said delivery device is in said second position.

3. A volumetric filling machine according to claim 2 wherein said means for activating the first activating device comprises a cam follower roller supported by a small arm fixed for vertical movement with the delivery device and a cam, said delivery device in the second position, being in register with a fixed cam positioned along the trajectory followed by the roller and downstream of the container entry region of the machine, said cam being shaped in such a way as to move the cam follower roller into contact with said first activating device during rotation of the platforms as the containers are carried from the entry region to the exit region of the machine.

4. A volumetric filling machine, according to claim 1 wherein said dosage delivery apparatuses further include a pneumatic circuit for actuating said control valve and wherein said filling machine includes a revolving distributor means connected to the first and second platforms for connecting each dosage delivery apparatus to a supply of the product and to the pneumatic circuit, said revolving distributor means comprising a number of coupling connections equal to the number of seatings on the periphery of the second revolving platform.

* * * * *